United States Patent
Uppili

(10) Patent No.: US 10,841,399 B2
(45) Date of Patent: Nov. 17, 2020

(54) SYSTEM AND METHOD FOR GUARANTEEING QUALITY OF EXPERIENCE OF A USER IN AN ONLINE ENVIRONMENT BY IMPLEMENTING A REQUIRED CHANGE IN THE MOBILE NETWORK BASED ON QUALITY OF EXPERIENCE REQUIREMENTS AND RECEIVED QUALITY OF EXPERIENCE PARAMETERS

(71) Applicant: Tambora Systems Singapore Pte. Ltd., Singapore (SG)

(72) Inventor: Anand Uppili, Bangalore (IN)

(73) Assignee: TAMBORA SYSTEMS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/591,656

(22) Filed: Oct. 3, 2019

(65) Prior Publication Data
US 2020/0244765 A1    Jul. 30, 2020

(30) Foreign Application Priority Data
Jan. 24, 2019  (IN) ............................ 201941002890

(51) Int. Cl.
*H04L 29/08* (2006.01)
*H04W 28/24* (2009.01)

(52) U.S. Cl.
CPC ........... *H04L 67/322* (2013.01); *H04W 28/24* (2013.01)

(58) Field of Classification Search
CPC ............................. H04L 67/322; H04W 28/24
See application file for complete search history.

(56) References Cited

U.S. PATENT DOCUMENTS

| | | | |
|---|---|---|---|
| 6,970,924 B1* | 11/2005 | Chu .................... | H04L 41/5067 709/224 |
| 7,039,039 B2* | 5/2006 | Cheong ................. | H04L 47/14 370/349 |
| 7,769,875 B1* | 8/2010 | Moisand ............... | H04L 67/322 709/229 |
| 8,194,698 B2* | 6/2012 | Senthilnathan ....... | H04L 47/783 370/464 |

(Continued)

FOREIGN PATENT DOCUMENTS

| | | |
|---|---|---|
| EP | 2642817 A1 | 9/2013 |
| WO | 2008/070869 A2 | 6/2008 |

*Primary Examiner* — Daniel C. Murray
(74) *Attorney, Agent, or Firm* — Rangarajan Sourirajan; Rajan Law Office, LLC

(57) ABSTRACT

A guaranteed quality of experience system (GQES) for delivering quality of experience for an internet application running on an end user device is provided. GQES receives quality of experience parameters related to a type of internet application running on the end user device, an information related to a quality the end user device is experiencing along with resource utilized in a mobile network and a content provider server by the internet application running on the end user device. GQES determines a quality of experience requirements for the internet application running on the end user device based on the received parameters, and provides instructions to the mobile network and the content provider server to implement the required change in the mobile network to improve quality of experience for the internet application running on the end user device.

19 Claims, 8 Drawing Sheets

(56) References Cited

U.S. PATENT DOCUMENTS

| | | | | |
|---|---|---|---|---|
| 8,331,901 B2* | 12/2012 | Raleigh | H04M 15/80 | 455/405 |
| 8,489,923 B1* | 7/2013 | Lakshminarayanan | H04L 67/22 | 714/26 |
| 8,780,909 B2* | 7/2014 | Shatzkamer | H04L 47/20 | 370/391 |
| 8,817,618 B2* | 8/2014 | Dahod | H04W 28/0268 | 370/231 |
| 8,903,955 B2* | 12/2014 | Kansal | H04L 65/4084 | 709/219 |
| 8,929,859 B2* | 1/2015 | McNamee | H04L 12/1414 | 455/406 |
| 9,065,739 B2* | 6/2015 | Cheng | H04L 47/283 | |
| 9,197,708 B2* | 11/2015 | Huang | H04L 67/02 | |
| 9,202,017 B2* | 12/2015 | Fletcher | H04L 47/803 | |
| 9,220,025 B2* | 12/2015 | Poon | H04B 17/0082 | |
| 9,544,201 B2* | 1/2017 | Sanchez Vega | H04L 41/0893 | |
| 9,549,043 B1* | 1/2017 | Stoica | H04W 4/021 | |
| 9,609,492 B2* | 3/2017 | Hogan | H04L 41/5022 | |
| 9,615,288 B2* | 4/2017 | Rahman | H04W 40/00 | |
| 9,668,166 B2* | 5/2017 | Santhanam | H04L 65/1069 | |
| 9,699,766 B2* | 7/2017 | Chen | H04W 72/04 | |
| 9,948,511 B2* | 4/2018 | Tofighbakhsh | H04L 41/0816 | |
| 9,973,952 B1* | 5/2018 | Hosseinmostafa | H04W 24/08 | |
| 10,028,167 B2* | 7/2018 | Calin | H04L 45/22 | |
| 10,028,291 B2* | 7/2018 | Kotecha | H04W 72/12 | |
| 10,038,927 B2* | 7/2018 | Shatzkamer | H04N 21/4331 | |
| 10,172,062 B2* | 1/2019 | Halepovic | H04L 43/08 | |
| 10,305,952 B2* | 5/2019 | Shetty | H04L 65/4092 | |
| 10,512,121 B2* | 12/2019 | Venkatraman | H04M 15/64 | |
| 10,554,718 B2* | 2/2020 | Uppili | H04L 61/2514 | |
| 10,652,776 B2* | 5/2020 | Lau | H04W 24/10 | |
| 10,701,593 B2* | 6/2020 | Chaudhuri | H04W 28/24 | |
| 2004/0063497 A1 | 4/2004 | Gould | | |
| 2004/0260750 A1* | 12/2004 | Ruutu | H04L 47/70 | 709/200 |
| 2006/0036724 A1* | 2/2006 | Iizuka | H04L 67/322 | 709/223 |
| 2006/0149845 A1* | 7/2006 | Malin | H04L 67/322 | 709/228 |
| 2006/0215596 A1* | 9/2006 | Krishnaswamy | H04L 1/0017 | 370/328 |
| 2006/0234639 A1* | 10/2006 | Kushwaha | H04W 24/08 | 455/67.11 |
| 2007/0160072 A1* | 7/2007 | Thalanany | H04W 36/30 | 370/401 |
| 2008/0259834 A1 | 10/2008 | Joung et al. | | |
| 2009/0185618 A1 | 7/2009 | Liu et al. | | |
| 2010/0279653 A1* | 11/2010 | Poltorak | H04L 63/12 | 455/410 |
| 2012/0092990 A1* | 4/2012 | Tapia | H04M 15/80 | 370/232 |
| 2012/0195196 A1* | 8/2012 | Ghai | H04W 28/24 | 370/235 |
| 2012/0198081 A1* | 8/2012 | Zhao | H04L 47/767 | 709/227 |
| 2012/0296784 A1* | 11/2012 | Connor | H04L 67/322 | 705/34 |
| 2013/0044614 A1* | 2/2013 | Aguirre | H04W 28/24 | 370/252 |
| 2013/0095815 A1* | 4/2013 | Venkatraman | H04L 12/1407 | 455/422.1 |
| 2013/0227111 A1* | 8/2013 | Wright | G06F 9/5083 | 709/223 |
| 2013/0227120 A1* | 8/2013 | Yu | H04M 15/58 | 709/224 |
| 2014/0201333 A1* | 7/2014 | Kim | H04L 65/60 | 709/219 |
| 2015/0023170 A1* | 1/2015 | Kakadia | H04L 43/08 | 370/235 |
| 2015/0056960 A1* | 2/2015 | Egner | H04W 4/029 | 455/411 |
| 2015/0142986 A1* | 5/2015 | Reznik | H04L 63/08 | 709/228 |
| 2015/0341812 A1* | 11/2015 | Dion | H04N 21/2404 | 370/252 |
| 2015/0381665 A1* | 12/2015 | Horiuchi | H04L 12/1822 | 370/261 |
| 2016/0092907 A1* | 3/2016 | Girard | H04L 12/1475 | 705/14.36 |
| 2016/0191651 A1* | 6/2016 | Balakrishnan | H04L 67/2895 | 709/219 |
| 2016/0295429 A1* | 10/2016 | Enqvist | H04W 28/08 | |
| 2016/0296840 A1* | 10/2016 | Kaewell | A63F 13/352 | |
| 2017/0078405 A1* | 3/2017 | Horiuchi | H04L 67/141 | |
| 2017/0079059 A1 | 3/2017 | Li et al. | | |
| 2017/0317894 A1* | 11/2017 | Dao | H04W 28/24 | |
| 2018/0007586 A1* | 1/2018 | Wang | H04M 15/8016 | |
| 2019/0150036 A1* | 5/2019 | Nelson | H04W 4/025 | 370/395.21 |
| 2019/0174360 A1* | 6/2019 | Pang | H04W 72/1226 | |
| 2019/0306755 A1* | 10/2019 | Chaudhuri | H04W 12/06 | |
| 2019/0320479 A1* | 10/2019 | Choudhary | H04L 45/24 | |
| 2020/0029240 A1* | 1/2020 | Li | H04W 24/08 | |
| 2020/0275304 A1* | 8/2020 | Zhao | H04W 28/24 | |

* cited by examiner

SYSTEM AND METHOD FOR GUARANTEEING QUALITY OF EXPERIENCE OF A USER IN AN ONLINE ENVIRONMENT BY IMPLEMENTING A REQUIRED CHANGE IN THE MOBILE NETWORK BASED ON QUALITY OF EXPERIENCE REQUIREMENTS AND RECEIVED QUALITY OF EXPERIENCE PARAMETERS

CROSS-REFERENCE TO RELATED APPLICATIONS

This application claims priority to and the benefit of the non-provisional patent application titled "System And Method For Guaranteeing Quality Of Experience Of A User In An Online Environment", application number 201941002890, filed in the Indian Patent Office on Jan. 24, 2019. The specification of the above referenced patent application is incorporated herein by reference in its entirety.

BACKGROUND

The modern age of internet is touching almost every part of digital life. With connectivity becoming ubiquitous, the number of internet applications as well as users has ballooned over the last few years and continues to grow at a phenomenal rate. Thus, the internet applications similar to any new-age ecosystems also face challenges with this phenomenal growth. One of the biggest challenges for the internet application is the assurance or guarantee of quality of experience, for example, un-buffered high quality video content or an ability to provide un-interrupted connectivity for an e-commerce site when the purchase is happening. Further, with the advent of new age applications, for example, internet of things (IoTs), and self-driving vehicles, the quality of experience moves from just assuring bandwidth to other factors such as latency, assured connectivity and so on.

Until now, the internet applications and the network infrastructure providing the desired connectivity are working in two silos i.e. the connectivity infrastructure of a mobile network does not really know what internet application is running on end user device in order to optimize the network parameters, and neither does the internet application knows on what network infrastructure the internet application is running on. Thus, there exists a need to receive the quality of experience requirements related to the internet applications running on the end user device, and to optimize the network infrastructure parameters of the mobile network, so as to provide the required quality of experience for the internet application running on the end user device.

Hence, there is a long felt but unresolved need for a guaranteed quality of experience system and method for receiving the type of internet application running on the end user device, quality the end user device is experiencing along with the resource utilized of the mobile network, and the content provider server associated with the corresponding internet application for providing the required quality of experience for the internet application running on the end user device.

SUMMARY OF THE INVENTION

This summary is provided to introduce a selection of concepts in a simplified form that are further disclosed in the detailed description of the invention. This summary is not intended to determine the scope of the claimed subject matter.

A guaranteed quality of experience system comprising a receiving module, a processing module and, an acting module, disclosed herein addresses the above recited need for providing quality of experience for an internet application running on an end user device. The receiving module of the guaranteed quality of experience system is configured to receive one or more quality of experience parameters related to a type of internet application running on the end user device, quality the end user device is experiencing, along with one or more resources utilized in the mobile network and the content provider server by the internet application running on the end user device. The processing module is operatively coupled to the receiving module, the mobile network and the content provider server for determining one or more quality of experience requirements for the internet application running on the end user device based on the received quality of experience parameters for the internet application running on the end user device, and communicating the quality of experience requirements to the acting module, the mobile network, and the content provider server. The acting module is operatively coupled to the receiving module, the processing module, the mobile network, and the content provider server for providing instructions to the mobile network to improve the quality of experience for the internet application running on the end user device based on the determined quality of experience requirements.

In an embodiment, the internet application running on the end user device is at least an online video streaming application, an e-commerce application, an online video game, self-driven vehicle, drones, and internet of things (IoT) application.

In an embodiment, the method for providing quality of experience for an internet application running on an end user device comprises providing a guaranteed quality of experience system comprising a receiving module, a processing module and an acting module for providing quality of experience for the internet application running on the end user device. The method disclosed herein comprises receiving one or more quality of experience parameters related to a type of internet application running on the end user device, quality the end user device is experiencing along with one or more resource utilized in a mobile network and the content provider server by the receiving module; determining one or more quality of experience requirements for the internet application running on the end user device based on the received quality of experience parameters, and communicating the quality of experience requirements to the mobile network and the content provider server by the processing module; and providing instructions to the mobile network to implement a required change in the mobile network to improve the quality of experience for the internet application running on the end user device by the acting module based on the determined quality of experience requirements by the processing module.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein.

The description of a method, step or a component referenced by a numeral in a drawing is applicable to the description of that method step or component shown by that same numeral in any subsequent drawing herein.

DETAILED DESCRIPTION OF THE INVENTION

Figure 1:
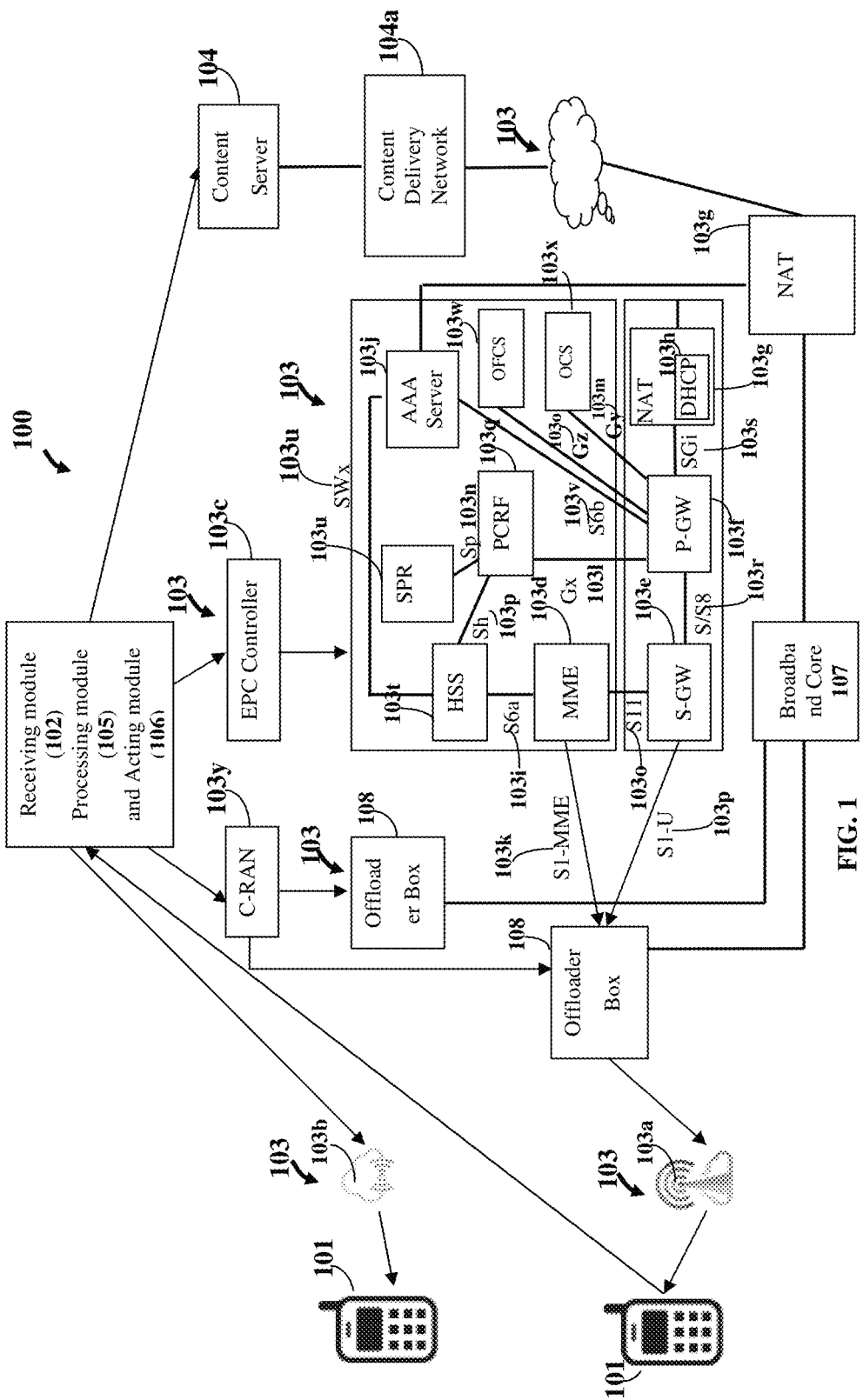
FIG. 1 exemplarily illustrates an architectural diagram of a guaranteed quality of experience system for providing a quality of experience for an internet application running on an end user device.

FIG. 1 exemplarily illustrates an architectural diagram of a guaranteed quality of experience system (GQES) 100 for providing a quality of experience for an internet application running on an end user device 101. As exemplarily illustrated in FIG. 1, the guaranteed quality of experience system (GQES) 100 for providing quality of experience for an internet application running on the end user device 101 comprises a receiving module 102, a processing module 105, and an acting module 106. As used herein, the term "end user device" 101 refers to a mobile device, a gaming console, a personal digital assistant, a tablet, an internet of things (IOT) device, a home appliance, a smart vehicle, a self-driven vehicle, drones and a smart meter. In a similar manner, the "mobile network" 103, as used herein, refers to a mobile network, a wireless network, for example, a wi-fi network and a fixed line network. In an embodiment, the mobile network 103 comprises base stations, for example, a Node-B 103a, a wi-fi application 103b, an evolved packet core 103c comprising a mobility management entity (MME) 103d, a serving gateway (S-GW) 103e, a packet data network gateway (P-GW) 103f, a network address translator (NAT) 103g, a DHCP interface 103h, a S6a Interface 103i, an Authentication, Authorization and Accounting (AAA) server 103j, a S1-MME interface 103k, a Gx interface 103l, a Gy interface 103m, a Sp interface 103n, a Gz interface 103o, a Sh interface 103p, a policy charging and rules function (PCRF) 103q as defined in the 3rd Generation Partnership Project (3GPP) standards.

In an embodiment, the mobility management entity (MME) 103d is configured to initiate a paging and authentication services for the end user device 101 connected to the mobile network 103 and retains location information at a tracking area level for each end user device 101, and then selects appropriate gateway, for example, the serving gateway 103e to transfer data packets received from the end user device 101. The MME 103d interfaces with the serving gateway 103e using a S11 interface 103o. The MME 103d interfaces with an offloader box 108 through a S1-MME interface 103k using a stream control transmission protocol (SCTP) to provide paging and authentication services for the end user device 101.

The serving gateway (S-GW) 103e routes and forwards the received data packets to a packet data network gateway (P-GW) 103f and other types of networks, for example a second generation network (2G) and a third generation network (3G). The serving gateway 103e interfaces with the packet data network gateway (P-GW) 103f using a S/S8 interface 103r. The serving gateway (S-GW) 103e interfaces with the offloader box 108 through a S1-U interface 103p using general packet radio service (GPRS) tunneling protocol for evolved packet services (GTPv2) for transferring user data.

The packet data network gateway (P-GW) 103f transfers the received data packets from the end user device 101 to other external networks, for example, the content provider server 104. The packet data network gateway (P-GW) 103f transfers the received data packets from the end user device 101 to other external networks, for example, the content provider server 104 using a SGi interface 103s. The packet data network gateway (P-GW) 103f also supports policy enforcement, packet filtering, charging support, lawful interception and packet screening for an user account associated with the end user device 101.

The home subscribe server (HSS) 103t contains user subscriber information, for example, an international mobile subscriber identity (IMSI), a mobile subscriber international subscriber directory number (MSISDN) and a mobile telephone number pertaining to an user account of the end user device 101, and user profile information, for example, service subscription and quality of service (QoS) parameters pertaining to the user account of the end user device 101. The subscriber profile repository (SPR) 103u contains subscriber state information, for example, active, inactive, televerified, non-televerified, subscriber and quality of service (QoS) parameters pertaining to the user account of the end user device 101. The AAA server 103j controls access to mobile network 103 resources, enforce policies, audits usage, and provide billing information for the services provided to the end user device 101. The AAA server 103j interfaces with the HSS 103t using a SWx 103u interface to get the user subscriber information. In a similar manner, the AAA server 103j interfaces with the packet data network gateway (P-GW) 103f using a S6b interface 103v to provide billing information for the data packets transferred from and to the end user device 101 through the mobile network 103.

The policy and charging rules function (PCRF) 103q provides packet data flow detection, policy enforcement and flow-based charging for the data packets transferred from and to the end user device 101 through the mobile network 103. The PCRF 103q aggregates information from various nodes in the mobile network 103, for example, from the HSS 103t, the SPR 103u using a Sh interface 103p, a Sp interface 103n to automatically create rules and policy decisions for each user account pertaining to the end user device 101 active on the mobile network 103. In an embodiment, the PCRF 103q creates rules and policy decisions comprising quality of services (QoS) levels, and charging rules pertaining to each user account associated with the end user device 101 of the mobile network 103. The PCRF 103q modifies one or more service flow settings in the base stations, for example, Node-B 103a pertaining to the created rules to provide the required quality of service for the internet application running on the end user device 101. In an embodiment, the PCRF 103q interfaces with the packet data network gateway (P-GW) 103f using a Gx interface 103l to modify one or more service data flow settings in the packet data network gateway (P-GW) 103f.

In an embodiment, the receiving module 102 is configured to receive one or more quality of experience parameters related to a type of internet application running on the end user device 101, an information related to a quality the end user device 101 is experiencing along with one or more resources utilized in the mobile network 103 and the content provider server 104. As used herein, the term "content provider server" refers to a content server which stores, retrieves and presents content, for example, a multimedia content, and an e-commerce website content. The processing module 105 is operatively coupled to the receiving module 102, the mobile network 103 and the content provider server 104 for determining one or more quality of experience requirements for the internet application running on the end user device 101 based on the received quality of experience parameters from the receiving module 102, and communicating the quality of experience requirements to the acting module 106, the mobile network 103 and the content provider server 104. The acting module 106 is operatively coupled to the receiving module 102, the processing module 105, the mobile network 103 and the content provider server 104 to provide instructions to the mobile network 103 and the content provider server 104 to implement a required change in the mobile network 103 to improve the quality of experience for the internet application running on the end user device 101 based on the determined quality of experience requirements by the processing module 105.

In an embodiment, the internet application running on the end user device 101 is at least an online video streaming application, an e-commerce application, an online video game, a self-driven vehicle, drones and internet of things (IoT) application.

The receiving module 102 is operatively coupled to the end user device 101 and the mobile network 103, for example to the network address translator 103g of the mobile network 103 to receive a mobile station international subscriber directory number of the end user device 101, an internet protocol address of the end user device 101 and to map the mobile station international subscriber directory number of the end user device 101 to the internet protocol address of the end user device 101. In an embodiment, the receiving module 102 receives the mobile station international subscriber directory number of the end user device 101, an internet protocol address of the end user device 101 from the network address translator 103g of the mobile network 103. In another embodiment, the receiving module 102 receives the mobile station international subscriber directory number of the end user device 101, an internet protocol address of the end user device 101 from the home subscribe server (HSS) 103t and the subscriber profile repository (SPR) 103u of the mobile network 103.

In an embodiment, the receiving module 102 receives information related to radio link strength and a radio link quality of the end user device 101 to provide the required quality of experience to the internet application running on the end user device 101. The receiving module 102 receives information related to the radio link strength and the radio link quality of the end user device 101 by using a mobile protocol stack received by a sensing application 1011 running on the end user device 101.

In an embodiment, an intelligent logic resides in the mobile network 103 in various nodes of the mobile network 103, for example, the network address translator interface 103g, the DHCP interface 103h, the S6a Interface 103i, the Authentication, Authorization and Accounting (AAA) server 103j, the S1-MME interface 103k, the GTPv2 protocol, the Gx interface 103l, the Gy interface 103m, and the Sp interface 103n and/or combinations thereof.

In an embodiment, the receiving module 102 is configured to receive information related to a quality of experiences related to one or more traffic parameters of a video content consumed on the end user device 101 by using a sensing application 1011 implemented on the end user device 101. The traffic parameters comprise, for example, name of a video content, a uniform resource locator of the video content, a bandwidth, a quality, a resolution of the video content, a time of viewing of the video content, buffering of the video content, total number of video bytes consumed by the end user device 101 for the video content.

In an embodiment, the receiving module 102 is configured to receive one or more network parameters comprising a location area code, a tracking area code, a base station information, for example, Node-B/e-Node B 103a details including the cell identifications (Cell IDs) of the mobile network 103 operatively coupled to the end user device 101; online/offline charging parameters pertaining to the user account of the end user device 102 comprising number of bytes consumed per service and cost incurred per service by interfacing with an offline charging system (OFCS) 103w, an online charging system (OCS) 103x, the home subscribe server (HSS) 103t, by using a Gy interface 103m, a Gz interface 103o and a Sh interface 103p of the mobile network 103. By interfacing with the offline charging system (OFCS) 103w, the receiving module 102 receives parameters related to the cost incurred per service concurrently for the network resource usage in the mobile network 103. In a similar manner, the online charging system (OCS) 103x provides information related to a current user account balance, and an user session based charging information.

In an embodiment, the receiving module 102 is configured to receive content provider server information from said content provider server 104. The content provider server information comprises information related to transcoding/trans-scaling of the video data consumed on the end user device 101, including any costs incurred therein, along with one or more resources utilized in the end user device 101 and the mobile network 103.

In an embodiment, the receiving module 102 receives resources utilized in radio access network of the mobile network 103, and the current latency obtained by the end user device 101, by using the base station information, for example, Node-B 103a information of the mobile network 103. The receiving module 102 receives a current bandwidth and a current video quality obtained by the end user device 101 for a service being provided to the end user device 101 by using the sensing application 1011 running on the end user device 101. In another embodiment, the receiving module 102 is configured to receive quality of experience parameters directly from the end user device 101 with operational parameters required for providing the required quality of experience for the internet application running on the end user device 101.

In an embodiment, the receiving module 102 is operatively coupled to the end user device 101 for receiving a type of internet application running on the end user device 101, an information related to a quality the end user device 101 is experiencing by using the sensing application 1011 running on the end user device 101. In another embodiment, the receiving module 102 is operatively coupled to the end user device 101 for receiving a type of internet application running on the end user device 101, quality the end user device 101 is experiencing by using a software development kit integrated onto the end user device 101. In an embodiment, the receiving module 1011 is integrated into the operating system, for example, Android® operating system of Google LLC running on the end user device 101. An intelligent logic resides in different nodes in the mobile network 103, for example, the network address translator interface 103g, the DHCP interface 103h, the S6a Interface 103*i*, the Authentication, Authorization and Accounting (AAA) server 103*j*, S1-MME interface 103*k*, GTPv2, Gx interface 103*l*, Gy interface 103*m* and Sp interface 103*n* and/or combinations thereof to receive information such as subscriber location, policy applied, user profile, usage of data and policy updates to provide the required quality of experience for the internet application running on the end user device 101.

A sensing application 400*i* is run on the content provider server 104 or a content delivery network 104*a* that gets loaded when the end user device 101 consumes the internet application to receive one or more quality of user requirements related to the type of internet application running on the end user device 101, quality the end user device 101 is experiencing along with one or more resources utilized in the mobile network 103 and the content provider server 104 by the internet application running on the end user device 101. In an embodiment, the sensing application 400*i* integrated with the content provider server 104 communicates with the end user device 101 to receive the required quality of experience parameters related to the internet application running on the end user device 101. In another embodiment, the receiving module 102 receives quality of experience parameters such as time, spectrum and space from a centralized-radio access network (C-RAN) 103*y* to directly influence the end-user device 101 quality requirements.

In an embodiment, the receiving module 102 is configured to derive a quality of experience (QoE) index from the received one or more QOE parameters related to the type of internet application running on the end user device 101, quality the end user device 101 is experiencing along with the resource utilized in the mobile network 103 and the content provider server 104 by the internet application running on the end user device 101. The derived quality of experience index is used by the processing module 105 for providing the required quality of experience requirements for the internet application running on the end user device 101. In another embodiment, the desired quality of experience (QoE) parameters received by the receiving module 102 is user-defined i.e. the receiving module 102 is configured to receive the user-defined quality of experience (QOE) parameters directly inputted by the user by using a graphical user interface 101*c* of the end user device 101. The user-defined quality of experience (QOE) parameters can be modified in real-time by the user by using the graphical user interface 101*c* of the end user device 101, and by a network operator by using the graphical user interface 100*c* of the guaranteed quality of experience system 100.

In an embodiment, the processing module 105 of the guaranteed quality of experience system 100 further comprises a rules engine for receiving the quality of experience parameters from the end user device 101, resources utilized at various nodes in the mobile network 103, process the received quality of experience parameters based on a set of rules and policies to provide the required quality of experience requirements to the end user device 101. For example, the rules engine upon receiving a trigger request for more bandwidth from the end user device 101, checks whether the user account pertaining to the MSISDN of the end user device is subscribed for the required QOS parameter, and sends a command to the corresponding PCRF 103*q* to set a guaranteed bit rate (GBR) with a value equal to or slightly greater than the required bandwidth, on a dedicated bearer with a given QoS Class Identifier (QCI).

In an embodiment, the processing module 105 checks whether the data quota pertaining to the user account requesting for the bandwidth has not been exceeded, and then sends the command to the corresponding PCRF 103*q* to set a guaranteed bit rate (GBR) with a value equal to or slightly greater than the required bandwidth, on a dedicated bearer with a given QoS Class Identifier (QCI). The processing module 105 checks whether the data quote pertaining to the user account has been exceeded or not by using a source IP address and port number of the end user device 101 from where the trigger request is received, and a source IP address and port number of the content provider server 104.

In an embodiment, the processing module 105 processes the received quality of experience parameters from the end user device 101 and process a set of rules and policies to provide the required quality of experience requirements based on the received quality of experience parameters to the end user device 101. Here, the rules are combined with machine learning to optimize the quality of experience provided to the end user device 101. In an embodiment, the rules engine is configurable by a network operator by using a graphical user interface 100*c* of the guaranteed quality of experience system (GQES) 100. The network operator is allowed to configure a list of internet applications for which the quality of experience is to be enhanced, a quality of experience threshold below which the rules has to kick-in, and a time duration for which the rules has to kick-in to provide the required quality of experience requirements for the internet application running on the end user device 101.

In an embodiment, the rules engine is configured to automatically set rules for a network slicing operation when the mobile network 103 is amendable for providing the required quality of experience for the internet application running on the end user device 101. The network slicing operation comprises, for example, changing schedule policies at one or more final radio networks on-a-fly based on the received quality of experience requirements from the end user device 101. In another embodiment, the rules for changing the network slicing operation comprises optimizing a radio access network by moving the end user device between different mobile networks 103.

The acting module 106 is operatively coupled to the receiving module 102, mobile network 103 and the content provider server 104 to provide instructions to modify a mobile network 103 resource in order to satisfy the quality of experience requirements of the end user device 101. In an embodiment, modifying the mobile network 103 comprises modifying bandwidth, latency, security parameters to provide the required quality of experience for the internet application running on the end user device 101. In an embodiment, the acting module 106 interfaces with a policy charging and rules function (PCRF) 103*q* to apply a specific policy for the end user device 101 at a particular time, when the end user device 101 is utilizing a specific kind of traffic. In another embodiment, the acting module 106 interfaces with a policy control enforcement function (PCEF) to apply a specific policy for the end user device 101 at a specific time and set ups a guaranteed bit rate to improve latency and connectivity to provide required quality of experience to the end user device 101. For example, the processing module 105 operatively coupled to the receiving module 102 receives the one or more values related to the quality of experience parameters, for example, a video quality V1, a latency V2, a bandwidth V3 and a security V4 to determine the required quality of requirements for the end user device 101. The acting module 106 based on the determined required quality of requirements for the end user device 101 checks for the following parameters, for example, network function virtualization (NFV) utilized, spectrum utilized in the mobile network 103, and central processing unit (CPU) load and power consumption in the end user device 101 and provides instructions to retain or change the values related to the quality of experience parameters V1, V2, V3 and V4 for the existing/new traffic in the mobile network 103 to modify the internet application, for example, online video streamed through a broadband core, using the offloader box 108 to the end user device 101, to provide quality of experience for the internet application running on the end user device 101.

In an embodiment, where the policy charging and rules function (PCRF) 103q comprises a RX interface, the acting module 106 can be configured to instruct a policy charging and rules function (PCRF) 103q to apply a specific policy for a user account pertaining to the end user device 101, when the end user device 101 is utilizing a specific kind of traffic.

In one embodiment, where the policy charging and rules function (PCRF) 103q do not have an RX interface, the acting module 106 maps the MSISDN of the end user device 101 with the IP address of the end user device 101 obtained from the NAT 103g of the mobile network 103, and then through a SOAP interface inform a subscriber profile repository (SPR) 103u in the PCRF 103q about the activation of a specific data package for the end user device 101. In another embodiment, the SPR 103u is located outside the PCRF 103q and communicates with the PCRF 103q through the Sp interface 103n as exemplarily illustrated in FIG. 1 about the activation of a specific data package for the end user device 101. The acting module 106 interfaces with the policy control enforcement function (PCEF), through a Gx interface 103l to apply a specific policy for the end user device 101 at a specific time and set ups a guaranteed bit rate to improve latency and connectivity to provide the required quality of experience to the end user device 101.

Figure 1A:
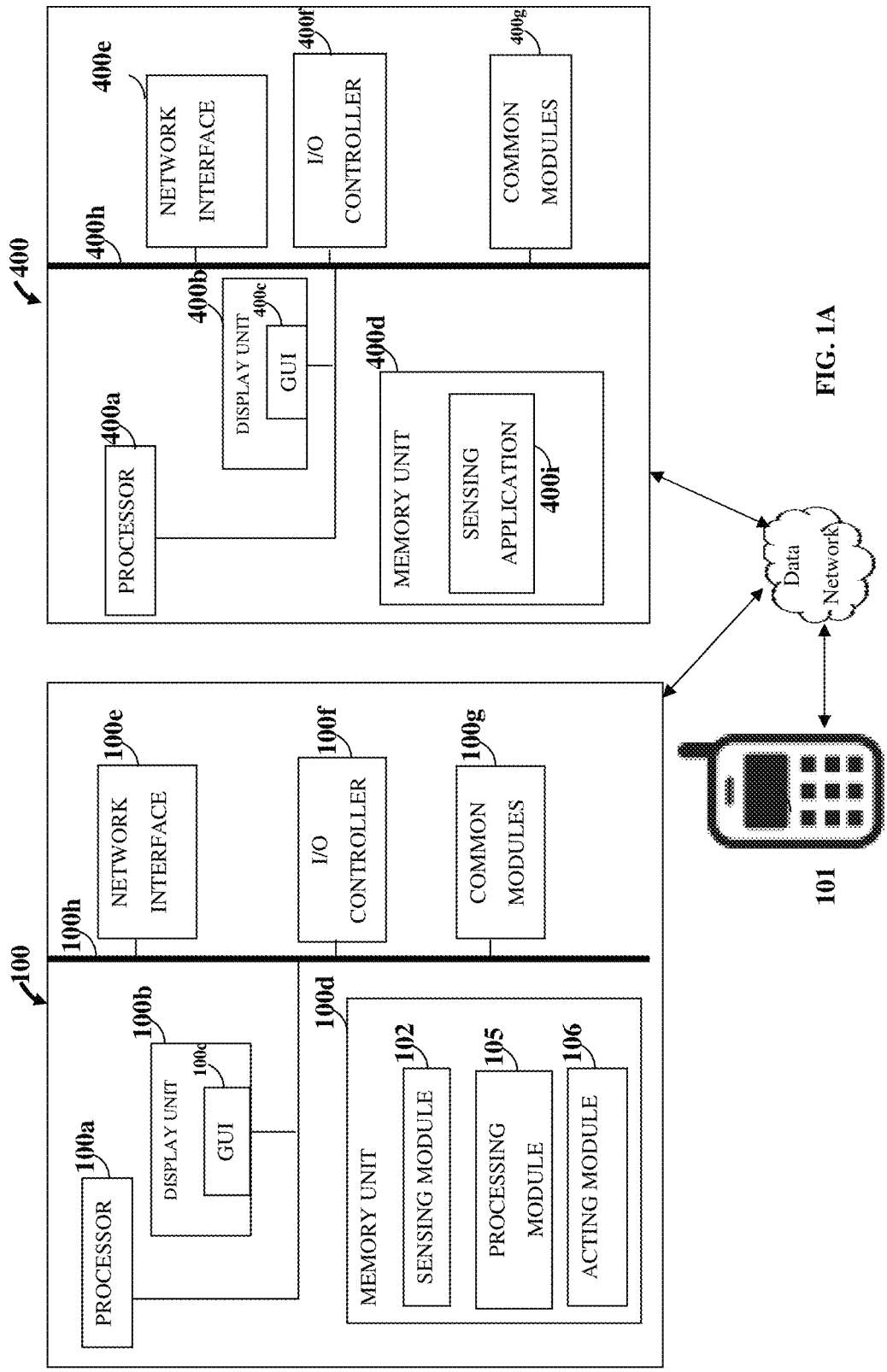
FIGS. 1A-1B exemplarily illustrates a block diagram of the guaranteed quality of experience system for providing the quality of experience for the internet application running on the end user device.
Figure 1B:
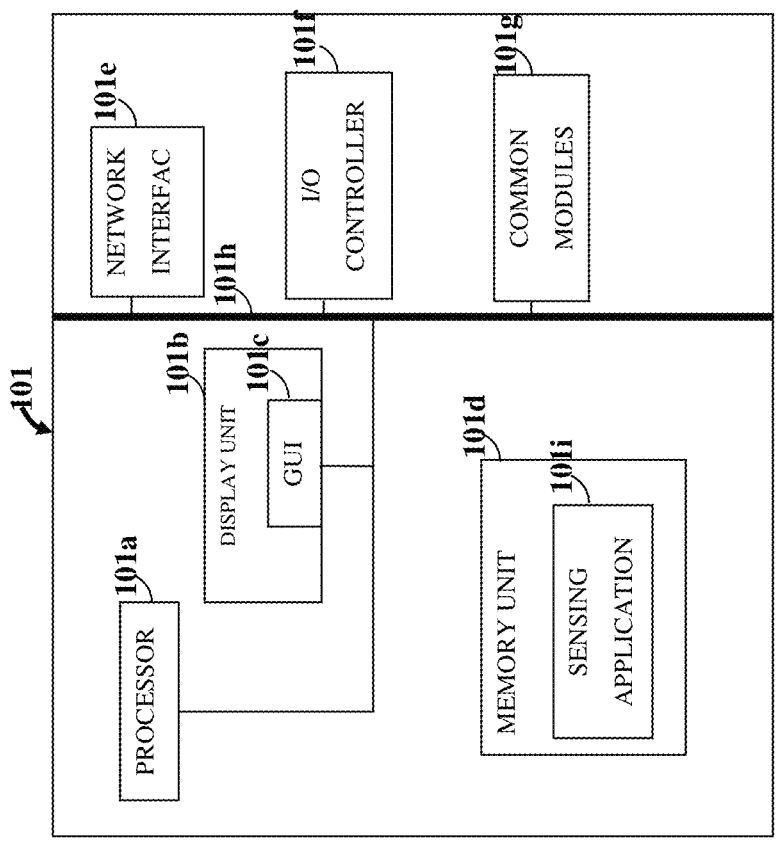

In an embodiment, the guaranteed quality of experience system (GQES) 100 sets up a dedicated bearer from the end user device 101 to the P-GW gateway 103f of the mobile network 103 to provide the required quality of experience to the internet application running on the end user device 101. The dedicated bearer could have, for example, a guaranteed bit rate associated with a specific quality of service class identifier to improve specific aspect of the mobile network 103 such as latency, connectivity etc. FIG. 1A and FIG. 1B exemplarily illustrates a block diagram of the guaranteed quality of experience system 100 for providing the quality of experience for the internet application running on the end user device 101. The guaranteed quality of experience system 100 is operatively coupled to the end user device 101, the mobile network 103 and the content provider server 104. The guaranteed quality of experience system 100 comprises one or more modules, namely, the receiving module 102, the processing module 105 and the acting module 106 for providing the required quality of service for the internet application running on the end user device 101, as disclosed in the detailed description of FIG. 1. In a similar manner, each of the end user device 101 and the content provider server 104 comprises the sensing application 101l, 400i, and the sensing module 102 is configured to receive quality of experience parameters related to the type of internet application running on the end user device 101, the quality the end user device 101 is experiencing along with one or more resources utilized in the mobile network 103 and the content provider server 104 by using the sensing application 101l, 400i implemented on the end user device 101, and the content provider server 104, as disclosed in the detailed description of FIG. 1.

The receiving module 102, the processing module 105 and the acting module 106 are implemented on the guaranteed quality of experience system 100 using programmed and purposeful hardware. Similarly, the sensing application 101l is implemented on the end user device 101, and the sensing application 400i is implemented on the content provider server 400 using programmed and purposeful hardware. As exemplarily illustrated in FIGS. 1A-1B, the guaranteed quality of experience system 100, the end user device 101 and the content provider server 104 comprises processors 100a, 101a, 401a operatively coupled to memory units 100d, 101d, 401d of the guaranteed quality of experience system 100, the end user device 101 and the content provider server 104. The processor 100a executes computer program instructions defined by the receiving module 102, a processing module 105 and an acting module 106 to provide the required quality of experience for the internet application running on the end user device 101. The processor 101a of the end user device 101 executes computer program instructions defined by the sensing application 101l to receive one or more quality of experience parameters related to the type of internet application running on the end user device 101, and the quality the end user device 101 is experiencing. In a similar manner, the processor 400a of the content provider server 400 executes computer program instructions defined by the sensing application 400i to receive the type of internet application running on the end user device 101, and the quality the end user device 101 is experiencing.

The processors 100a, 101a and 400a of the guaranteed quality of experience system 100, the end user device 101, and the content server provider 400 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processors 100a, 101a, 400a of the guaranteed quality of experience system 100, the end user device 101, and the content server provider 400 are implemented as a processor set comprising, for example, a programmed microprocessor and a math or graphics co-processor. The processors 100a, 101a, 400a of the guaranteed quality of experience system 100, the end user device 101, and the content server provider 400 are selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The guaranteed quality of experience system 100, the end user device 101, and the content server provider 400 disclosed herein is not limited to employing the processors 100a, 101a, 400a. In an embodiment, the guaranteed quality of experience system 100, the end user device 101, and the content server provider 400 employs controllers or microcontrollers.

As exemplarily illustrated in FIG. 1A and FIG. 1B, each of the guaranteed quality of experience system 100, the end user device 101, and the content server provider 400 further comprises a data bus 100h, 101h, 400h, a network interface 100e, 101e, 401e, an input/output (I/O) controllers 100f, 101f, 400f and common modules 100g, 101g, 400g where the common modules 100g, 101g, 400g comprises input devices, output devices, fixed media drives such as hard drives, removable media drives for receiving removable media, etc. The data bus 100*h* permits communication between the modules, for example, 102, 105, 106, etc., of the guaranteed quality of experience system 100.

The network interface 100*e*, 101*e*, 400*e* enables connection of the guaranteed quality of experience system 100, the end user device 101, and the content provider server 104 with each other and with the mobile network 103. In an embodiment, the network interface 100*e*, 101*e*, 400*e* is provided as an interface card also referred to as a line card. The network interface 100*e*, 101*e*, 400*e* is, for example, one or more of infrared (IR) interfaces, interfaces implementing Wi-Fi® of Wi-Fi Alliance Corporation, universal serial bus (USB) interfaces, FireWire® interfaces of Apple Inc., Ethernet interfaces, frame relay interfaces, cable interfaces, digital subscriber line (DSL) interfaces, token ring interfaces, peripheral controller interconnect (PCI) interfaces, local area network (LAN) interfaces, wide area network (WAN) interfaces, interfaces using serial protocols, interfaces using parallel protocols, Ethernet communication interfaces, asynchronous transfer mode (ATM) interfaces, high speed serial interfaces (HSSIs), fiber distributed data interfaces (FDDIs), interfaces based on transmission control protocol (TCP)/internet protocol (IP), interfaces based on wireless communications technology such as satellite technology, radio frequency (RF) technology, near field communication, etc. The I/O controllers 100*f*, 101*f*, 400*f* control input actions and output actions performed by the guaranteed quality of experience system 100.

In an embodiment, the guaranteed quality of experience system 100, the end user device 101 and the content provider server 104 further comprises a display unit 100*b*, 101*b*, 400*b* that displays the graphical user interface (GUI) 100*c*, 101*c*, 400*c* of the guaranteed quality of experience system 100, the end user device 101, and the content provider server 104. The display unit 100*b*, 101*b*, 400*b* is, for example, a video display, a liquid crystal display, a plasma display, an organic light emitting diode (OLED) based display, etc. For example, the display unit 100*b* via the GUI 100*c* displays information, interfaces, user interface elements to receive user quality of experiences, for example, allowing the network operator to create a set of rules and policies to provide the required quality of experience requirements for the internet application running on the end user device 101. The GUI 100*c*, 101*c*, 400*c* is, for example, an online web interface, a web based downloadable application interface, a mobile based downloadable application interface, etc.

The processors 100*a*, 101*a*, 400*a* of the guaranteed quality of experience system 100, the end user device 101, and the content provider server 400 executes an operating system, for example, one of the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The guaranteed quality of experience system 100, the end user device 101 and the content provider server 400 employs its respective operating systems for performing multiple tasks. The operating systems recognize, for example, quality of experiences provided by a user, files, and directories stored locally on the respective fixed media drives. The operating systems of the guaranteed quality of experience system 100, the end user device 101 and the content provider server 400 executes different programs using the processor 100*a*, 101*a*, 400*a* for which application programs in high level programming languages are written.

The processors 100*a*, 101*a*, 400*a* of the guaranteed quality of experience system 100, the end user device 101 and the content provider server 400 retrieves instructions defined by the modules 102, 105, 106, the sensing application 101l, 400*i* exemplarily illustrated in FIG. 1A, in the memory unit 100*d*, 101*d*, 400*d* of the guaranteed quality of experience system 100, the end user device 101, and the content provider server 400 for performing respective functions disclosed in the detailed description of FIG. 1.

A program counter determines the location of the instructions in each of the memory unit 100*d*, 101*d*, 400*d*. The program counter stores a number that identifies the current position in the program of each of the modules, for example, 102, 105, 106 etc., of the guaranteed quality of experience system 100 respectively. The instructions fetched by the processor 100*a*, 101*a*, 400*a* from the memory unit 100*d*, 101*d*, 400*d* respectively, after being processed are decoded. The instructions are stored in an instruction register in each of the processor 100*a*, 101*a*, 400*a*. After processing and decoding, the processor 100*a*, 101*a*, 400*a* executes the instructions, thereby performing one or more processes defined by those instructions.

At the time of execution, the instructions stored in the instruction register are examined to determine the operations to be performed. The processor 100*a*, 101*a*, 400*a* of the guaranteed quality of experience system 100, then performs the specified operations. The operations comprise arithmetic operations and logic operations. The respective operating systems perform multiple routines for performing a number of tasks required to assign the memory unit 100*d*, 101*d*, 400*d* for execution of the modules, for example, 102, 105, 106 on the guaranteed quality of experience system 100, sensing application 101l on the end user device 101, and the sensing application 400*i* on the content server provider 400. The tasks performed by the respective operating systems comprise, for example, assigning memory to the modules, for example, 102, 105, 106, on the guaranteed quality of experience system 100, moving data between the memory unit 100*d* and disk units, and handling input/output operations. The respective operating systems perform the tasks on request by the operations and after performing the tasks, the respective operating systems transfer the execution control back to the processor 100*a*. The processor 100*a* continues the execution to obtain one or more outputs. The outputs of the execution of the modules, for example, 102, 105, 106, etc., on the guaranteed quality of experience system 100, is to provide the required quality of experience for an online video streaming application running on the end user device 101.

For purposes of illustration, the detailed description refers to each of the guaranteed quality of experience system 100, the end user device 101, and the content provider server 400 are being run as single computer systems; however, the scope of the method and the system 100, the end user device 101, and the content provider server 400 disclosed herein is not limited to the guaranteed quality of experience system, the end user device 101, and the content provider server 400 being run locally as single computer systems via their respective operating systems and processors 100*a*, 101*a*, 400*a* but may be extended to run remotely over a data network by employing a web browser and a remote server, a mobile phone, or other electronic devices. In an embodiment, one or more portions of the system 100, the end user device 101, and the content provider server 104 disclosed herein are distributed across one or more computer systems (not shown) coupled to the data network. Furthermore, although the detailed descriptions of FIG. 1 relate to an implementation of the guaranteed quality of experience system comprising the receiving module 102, the processing module 105, and the acting module 106, the guaranteed quality of experience system 100 is not limited to be implemented using the receiving module 102, the processing module 105, and the acting module 106, but may be extended to be implemented using a single server or a network of two or more servers and computer systems.

The non-transitory computer readable storage media disclosed herein stores computer program codes comprising instructions executable by the processor 100a, 101a, 400a for receiving the type of internet application running on the end user device 101, and for providing the required quality of experience for the internet application running on the end user device 101. In the non-transitory computer readable storage media of the guaranteed quality of experience system 100, the computer program codes comprise a first computer program code for receiving one or more quality of experience parameters related to a type of internet application running on the end user device 101, quality the end user device 101 is experiencing along with the one or more resources utilized in a mobile network 103 and a content provider server 104 by the internet application running on the end user device 101, by operatively coupling with the end user device 101, a mobile network 103 and a content provider server 104 as disclosed in the detailed description of FIG. 1; a second computer program code for determining one or more quality of experience requirements for the internet application running on the end user device 101 based on the received quality of experience requirements and communicating the quality of experience requirements to the mobile network 103 and the content provider server 104 as disclosed in the detailed description of FIG. 1; and a third computer program code for providing instructions to one or more of the mobile network 103 and the content provider server 104 to implement the required change in the mobile network 103 to improve the quality of experience for the internet application running on the end user device 101 based on the determined quality of experience requirements as disclosed in the detailed description of FIG. 1.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used in the method disclosed herein are C, C++, C #, Java®, JavaScript®, Fortran, Ruby, Perl®, Python®, Visual Basic®, hypertext preprocessor (PHP), Microsoft®.NET, Objective-C®, the Swift™ programming language of Apple Inc., etc. Other object-oriented, functional, scripting, and/or logical programming languages can also be used. In an embodiment, the computer program codes or software programs are stored on or in one or more mediums as object code. In another embodiment, various aspects of the method and the system 100 exemplarily illustrated in FIGS. 1-1A, disclosed herein are implemented in a non-programmed environment comprising documents created, for example, in a hypertext markup language (HTML), an extensible markup language (XML), or other format that render aspects of the graphical user interface (GUI) 100c exemplarily illustrated in FIG. 1A, or perform other functions, when viewed in a visual area or a window of a browser program. In another embodiment, various aspects of the method and the system 100 disclosed herein are implemented as programmed elements, or non-programmed elements, or any suitable combination thereof.

FIGS. 2A-2D exemplarily illustrates a process flow for providing the required quality of experience for the internet application running on the end user device 101.

Figure 2A:
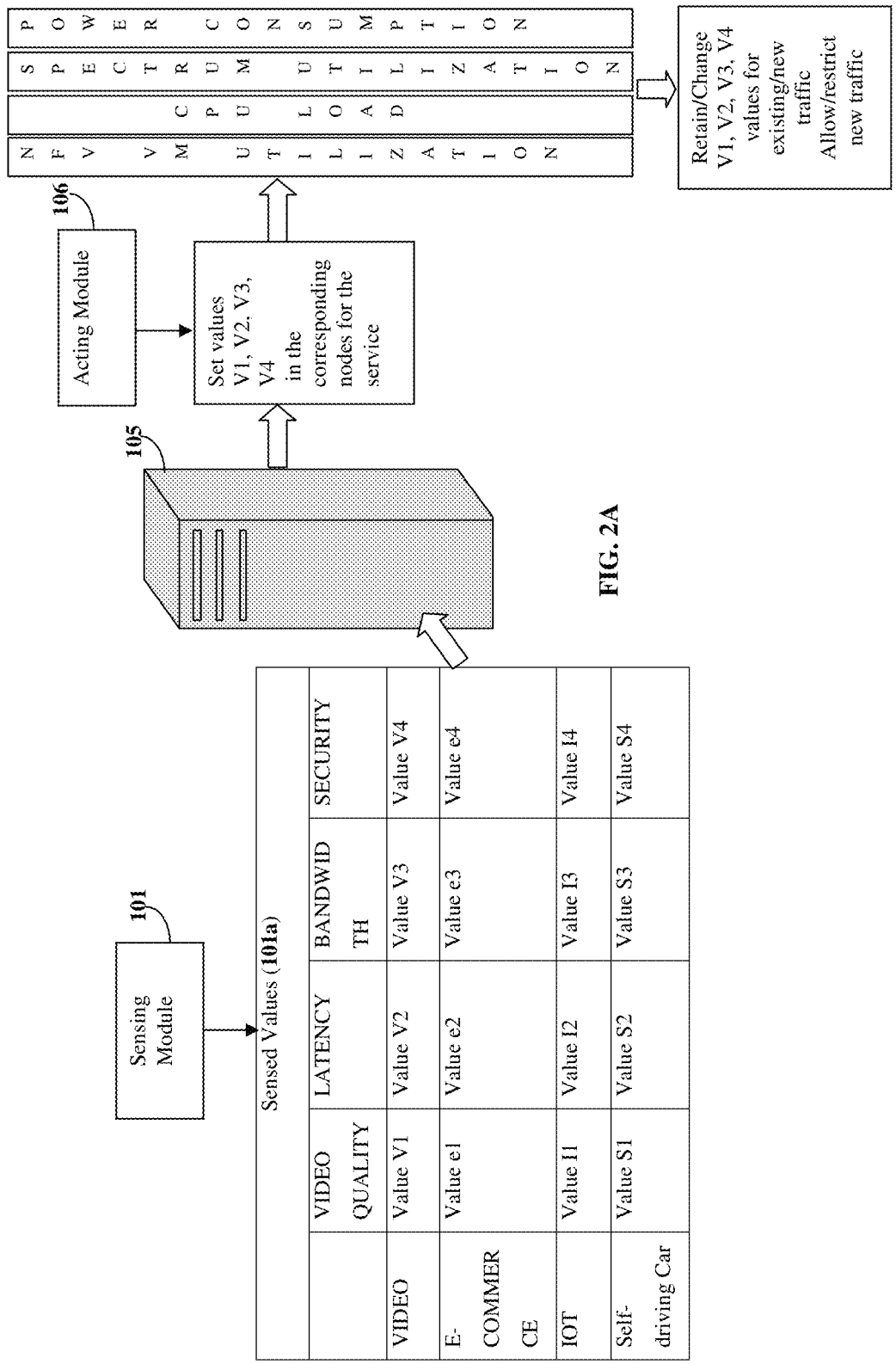
FIGS. 2A-2D exemplarily illustrates a process flow for providing the required quality of experience for the internet application running on the end user device.

As exemplarily illustrated in FIG. 2A, the guaranteed quality of experience system 100 is configured to provide the required quality of experience for an online video streaming application running on the end user device 101. The receiving module 102 is operatively coupled to the end user device 101 for receiving a type of internet application, for example, online video streaming application, running on the end user device 101, quality the end user device 101 is experiencing along with the resource utilized of the mobile network 103, and the content provider server 104. In an embodiment, the receiving module 102 is configured to receive one or more quality of experience parameters, for example, a video quality (V1), a latency (V2), a bandwidth (V3) and a security (V4) of the internet application, for example, online video streaming application running on the end user device 101. The processing module 105 is operatively coupled to the receiving module 102 to receive values pertaining to the quality of experience parameters, for example, a value of 1280×720 frame per second (fps) for V1, a value of 1 second for V2, a value of 5 megabits per second for V3, and a value for V4 to determine the required quality of requirements for the end user device 101. The acting module 106 based upon the determined quality of requirements received for the end user device 101 from the processing module 105 checks for the following parameters, for example, network function virtualization (NFV) utilized, spectrum utilized in the mobile network 103, and central processing module (CPU) load and power consumption in the end user device 101, and provides instructions to either retain or change the values V1, V2, V3 and V4 for the existing/new traffic to provide the required quality of experience for the streamed online video in real-time thereby providing assured bandwidth and ensuring minimum resolution for comfortable viewing of the videos streamed by the online video streaming application on the end user device 101. In an embodiment, based on the received parameters related to transcoding/trans-scaling information of the video content on the content server provider 104, the GQES 100 transcodes/transcales the video content streamed on the end user device 101 to provide the required quality experience for the video content streamed on the end user device 101. As used herein, the term, network function virtualization is a network architecture concept that uses the technologies of virtualization to virtualize entire classes of network node functions to create communication services. In an embodiment, the value for V4 is one of a video encryption algorithm (VEA), modified video encryption algorithm (MVEA), real-time video encryption algorithm (RVEA), perceptual video encryption algorithm (PVEA), secure motion pictures expert group (SECMPEG), multiple huffman tables (MHT), multiple state indices, blowfish, international data encryption algorithm, message-digest algorithm (MD5), advanced encryption algorithm (AES), secure hash algorithm (SHA1), hash message authentication code (HMAC) algorithm and rivest-shamir-adleman (RSA) algorithm.

Figure 2B:
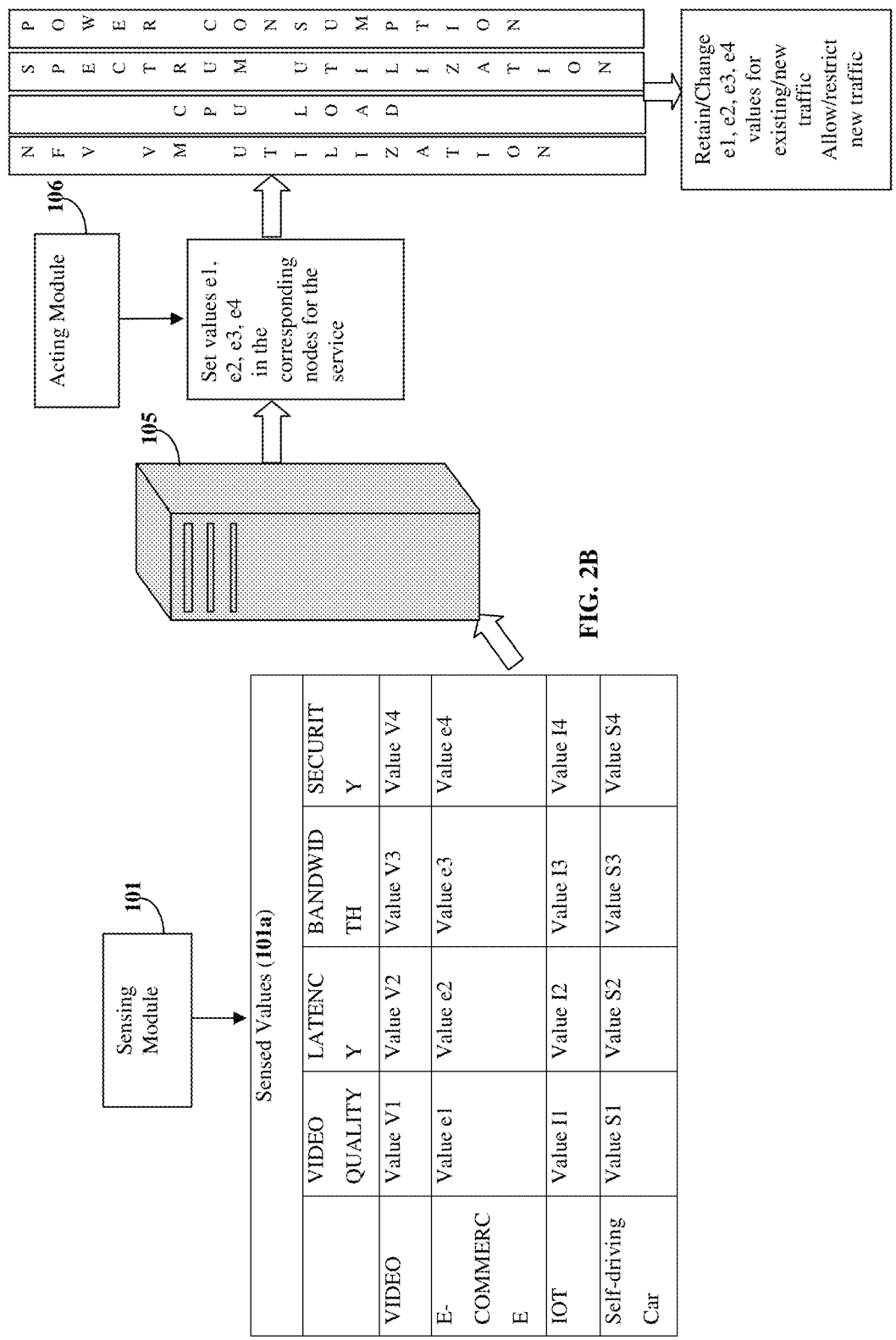

In a similar manner, the processing module 105 is operatively coupled to the receiving module 102 to receive values pertaining to the quality of experience parameters, for example, a value of 800×600 fps for the video quality (e1), a value of 0.5 seconds for the latency (e2), a value of 1 megabyte per second for the bandwidth (e3), and a value for the security (e4) for the e-commerce application running on the end user device 101 as exemplarily illustrated in FIG. 2B. The processing module 105 determines the required quality of requirements for the end user device 101 from the received values e1, e2, e3 and e4. The acting module 106 operatively coupled to the processing module based upon the determined required quality of requirements checks for the following parameters, for example, the network function virtualization (NFV) utilized, the spectrum utilized in the mobile network 103, and the central processing module (CPU) load and the power consumption in the end user device 101 and provides instructions to either retain or change the values e1, e2, e3 and e4 for the existing/new traffic so as to ensure assured connectivity of the e-commerce application to the mobile network 103, and the content provider server 104 during the e-commerce transaction so that the payment is not dropped or abandoned. In an embodiment, the value for security e4 is one of a rivest-shamir-adleman (RSA) algorithm, symmetric key encryption algorithm and an asymmetric key encryption algorithm.

Figure 2C:
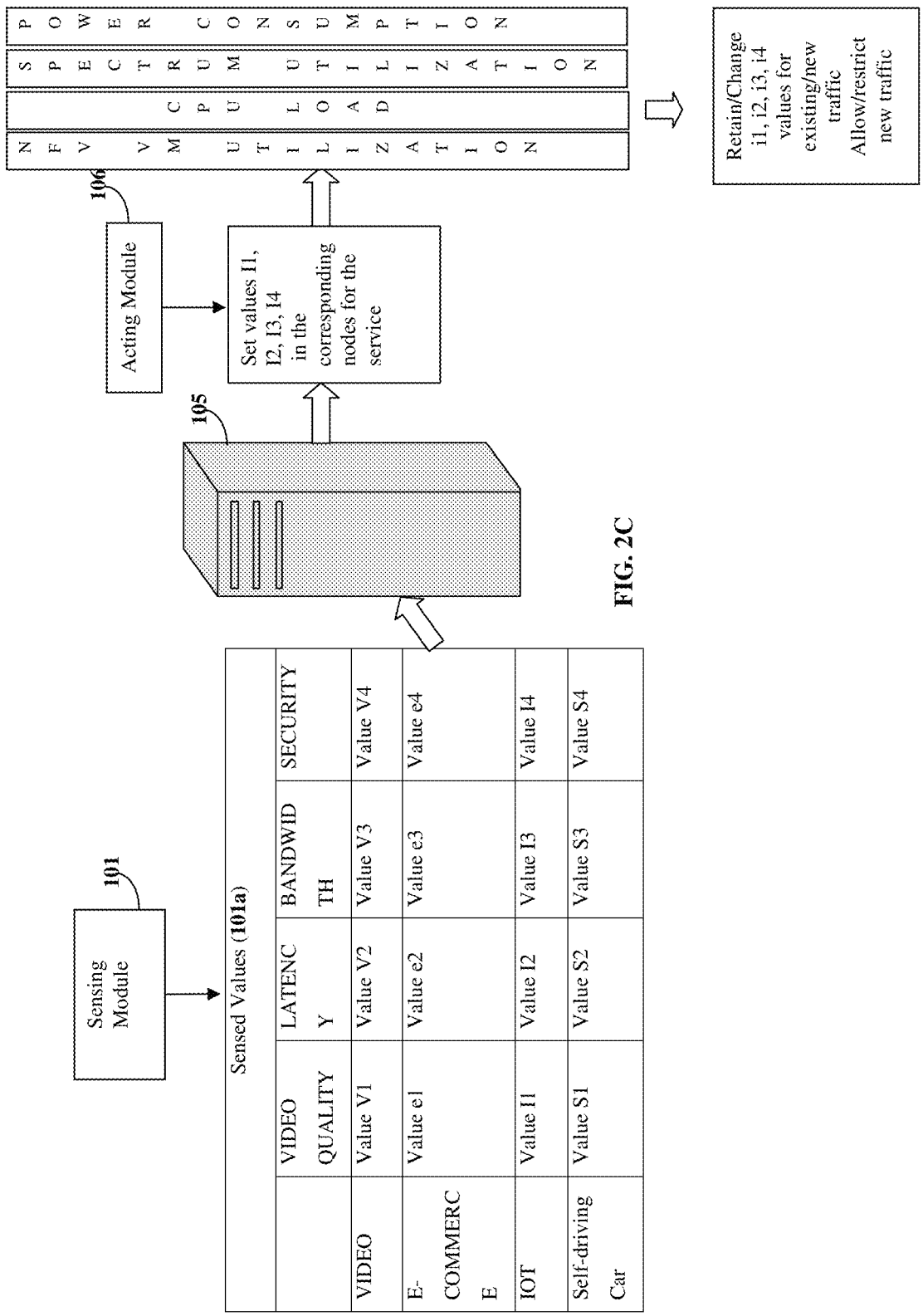

In an embodiment, as exemplarily illustrated in FIG. 2C, the processing module 105 is operatively coupled to the receiving module 102 to receive values pertaining to the quality of experience parameters, for example a value of 100 milliseconds for the latency (I2), a value of 200 kilobits per second for the bandwidth, (I3), and a value for the security (I4) of the IOT application, for example smart lights, alarm systems, and smart meters 101. The processing module 105 determines the required quality of requirements for the end user device 101 from the received values I1, I2, I3 and I4. The acting module 106 operatively coupled to the processing module checks for the following parameters, for example, network function virtualization (NFV) utilized, spectrum utilized in the mobile network 103, and central processing module (CPU) load and power consumption in the end user device 101 and then either retains or changes the values I2, I3 and I4 for the existing/new traffic to provide assured connectivity for the IOT applications that requires assured connectivity in order to be 'always on' or stay connected for access and control. The value for security V4 is one of a diffie-hellman (DH) algorithm, rivest-shamir-adleman (RSA) algorithm and elliptic curve cryptograph (ECC) algorithm.

Figure 2D:
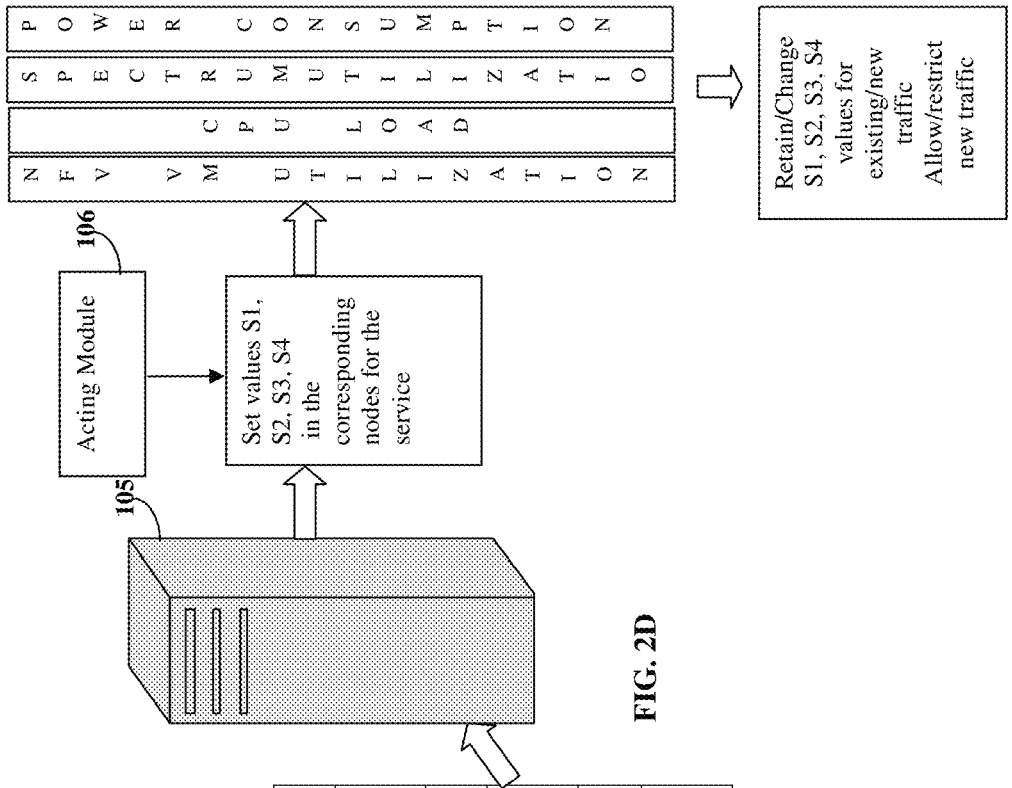

In an embodiment, as exemplarily illustrated in FIG. 2D, the processing module 105 is operatively coupled to the receiving module 102 to receive values pertaining to the quality of experience parameters, for example, a value of 1280×720 fps for the video quality (S1), a value of 50 milliseconds (ms) for the latency (S2), a value of 5 megabits per seconds (Mbps) for the bandwidth (S3), and a value for the security (S4) from a central system of a smart vehicle 101, for example, self-driving cars, and drones. The processing module 105 determines the required quality of requirements for the end user device 101 from the received values S1, S2, S3 and S4. The acting module 106 operatively coupled to the processing module 105 receives the required quality of requirements for the end user device 101 and checks for the following parameters, for example, the network function virtualization (NFV) utilized, the spectrum utilized in the mobile network 103, and the central processing module (CPU) load and the power consumption in the end user device 101 and then provide instructions to either retain or change the values S1, S2, S3 and S4 for the existing/new traffic in the mobile network 103 to provide assured connectivity with low latencies to ensure that the smart vehicle 101 receives data from various components within the smart vehicle and communicates with other user devices 101, for example, mobile phone, self-driving cars, and drones in real-time seamlessly. In an embodiment, the GQES 100 also provides quality of requirements for an online video game application running on the end user device 101 that needs assured bandwidth and low latency to ensure good user experience. The value for V4 is one of a diffie-hellman (DH) algorithm, rivest-shamir-adleman (RSA) algorithm and elliptic curve cryptograph (ECC) algorithm.

Figure 3:
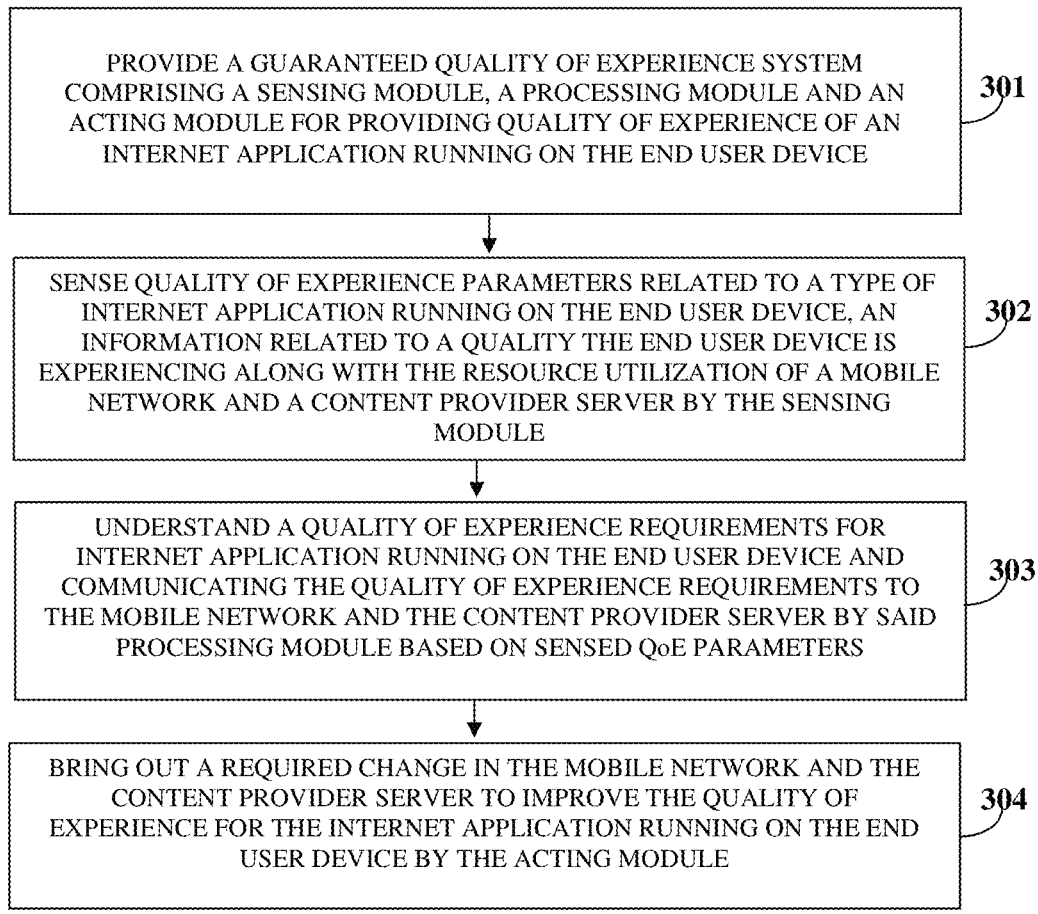
FIG. 3 exemplarily illustrates a method for providing the required quality of experience for an internet application running on an end user device.

FIG. 3 exemplarily illustrates a method for providing quality of experience for an internet application running on an end user device 101.

As exemplarily illustrated in FIG. 3, the method for providing quality of experience for an internet application running on an end user device 101 comprises providing a guaranteed quality of experience system 100 comprising a receiving module 102, a processing module 105 and an acting module 106 for providing quality of experience for the internet application running on the end user device 101. The receiving module 102 is operatively coupled to the end user device 101, a mobile network 103 and a content provider server 104, processing module 105 is operatively coupled to the receiving module 102, mobile network 103 and the content provider server 104, acting module 106 is operatively coupled to the receiving module 102, mobile network 103 and the content provider server 104 to provide the required quality of experience for the internet application running on the end user device 101.

The method disclosed herein receives 302 one or more quality of experience parameters related to a type of internet application running on the end user device 101, an information related to a quality the end user device 101 is experiencing along with one or more resources utilized in the mobile network 103 and a content provider server 104 by the internet application running on the end user device, by using the receiving module 102. The method determines one or more quality of experience requirements for the internet application running on the end user device 101 based on the received quality of experience parameters, and communicates the determined quality of experience requirements to the mobile network 103 and the content provider server 104, by using the processing module 105. The method disclosed herein, provides instructions to the mobile network 103 and the content provider server 104 to implement a required change in the mobile network 103 to improve the quality of experience for the internet application running on the end user device 101 by using the acting module 106 based on the determined quality of experience requirements by the processing module 105.

The method and the guaranteed quality of experience system (GQES) 100 disclosed herein can be configured to work in a network environment comprising one or more computers that are in communication with one or more end user devices 102, content server provider 104 and a mobile network 103. In an embodiment, the computers communicate with the end user devices 102, content server provider 104 directly or indirectly, via a wired medium or a wireless medium such as the Internet, a local area network (LAN), a wide area network (WAN) or the Ethernet, a token ring, or via any appropriate communications mediums or combination of communications mediums. Each of the end user devices 102 comprises processors, examples of which are disclosed above, that are adapted to communicate with the computers. In an embodiment, each of the computers is equipped with a network communication device, for example, a network interface card, a modem, or other network connection device suitable for connecting to a mobile network 103. Each of the computers and the end user devices 102 executes an operating system, examples of which are disclosed above. While the operating system may differ depending on the type of computer, the operating system provides the appropriate communications protocols to establish communication links with the mobile network 103. Any number and type of machines may be in communication with the computers.

The method and the system 100 disclosed herein are not limited to a particular computer system platform, processor, operating system, or network. In an embodiment, one or more aspects of the method and the system 100 disclosed herein are distributed among one or more computer systems, for example, servers configured to provide one or more services to one or more client computers, or to perform a complete task in a distributed system. For example, one or more aspects of the method and the system 100 disclosed herein are performed on a client-server system that comprises components distributed among one or more server systems that perform multiple functions according to various embodiments. These components comprise, for example, executable, intermediate, or interpreted code, which communicate over the data network using a communication protocol. The method and the system 100 disclosed herein are not limited to be executable on any particular system or group of systems, and are not limited to any particular distributed architecture, network, or communication protocol.

The foregoing examples have been provided merely for explanation and are in no way to be construed as limiting of the method and the guaranteed quality of experience system (GQES) 100 disclosed herein. While the method and guaranteed quality of experience system (GQES) 100 have been described with reference to various embodiments, it is understood that the words, which have been used herein, are words of description and illustration, rather than words of limitation. Furthermore, although the method and the guaranteed quality of experience system (GQES) 100 have been described herein with reference to particular means, materials, and embodiments, the method and the guaranteed quality of experience system (GQES) 100 are not intended to be limited to the particulars disclosed herein; rather, the method and the guaranteed quality of experience system (GQES) 100 extend to all functionally equivalent structures, methods and uses, such as are within the scope of the appended claims. While multiple embodiments are disclosed, it will be understood by those skilled in the art, having the benefit of the teachings of this specification, that the method and the guaranteed quality of experience system (GQES) 100 disclosed herein are capable of modifications and other embodiments may be effected and changes may be made thereto, without departing from the scope and spirit of the method and the guaranteed quality of experience system (GQES) 100 disclosed herein.

I claim:

1. A guaranteed quality of experience system for providing a quality of experience for an internet application running on an end user device, said guaranteed quality of experience system comprising:
    a non-transitory computer readable storage media for storing computer program instructions defined by one or more modules of said guaranteed quality of experience system;
    at least one processor communicatively coupled to said non-transitory computer readable storage media, said at least one processor configured to execute said computer program instructions defined by said modules of said guaranteed quality of experience system, said modules comprising:
        a receiving module, wherein said receiving module is configured to receive one or more quality of experience parameters related to a type of internet application running on said end user device, an information related to a quality said end user device is experiencing along with one or more resources utilized in a mobile network and a content provider server by said internet application running on said end user device;
        a processing module configured to determine one or more quality of experience requirements for said internet application running on said end user device based on said received quality of experience parameters from said receiving module, and communicating said quality of experience requirements to said acting module, said mobile network, and said content provider server; and
        an acting module configured to provide instructions to one or more of said mobile network and said content provider server to implement a required change in said mobile network to improve a quality of experience for said internet application running on said end user device based on said determined quality of experience requirements by said processing module.

2. The guaranteed quality of experience system of claim 1, wherein said receiving one or more quality of experience parameters by said receiving module comprises receiving at least one of:
- a mobile station international subscriber directory number of said end user device;
- an internet protocol address of said end user device;
- mapping of said mobile station international subscriber directory number of said end user device to said internet protocol address of said end user device;
- information related to a radio link strength and a radio link quality of said end user device;
- one or more traffic parameters of a video content consumed on said end user device, wherein said traffic parameters comprises name of a video content, a uniform resource locator of said video content, a bandwidth, a quality, a resolution of said video content, time of viewing of said video content, buffering of said video content, total number of video bytes consumed by said end user device for said video content;
- one or more network parameters comprising location area code, tracking area code, Node-B/e-Node B details of said mobile network operatively coupled to said end user device;
- one or more online/offline charging parameters of each of said mobile network comprising number of bytes consumed per service and cost incurred per service for an user account associated with said end user device;
- a content provider server information from said content provider server, said content provider server information comprises information related to transcoding/trans-scaling of video data consumed, along with one or more resource utilized in said end user device and said mobile network;
- one or more resources utilized in a radio access network of said mobile network;
- a current bandwidth obtained by said end user device; and
- a current latency and a current video quality obtained by said end user device for a service being provided to said end user device.

3. The guaranteed quality of experience system of claim 2, wherein said receiving module receives said mobile station international subscriber directory number of said end user device, said internet protocol address of said end user device from a home subscribe server and a subscriber profile repository of said mobile network.

4. The guaranteed quality of experience system of claim 2, wherein said receiving module receives said mobile station international subscriber directory number of said end user device, said internet protocol address of said end user device from a network address translator of said mobile network.

5. The guaranteed quality of experience system of claim 2, wherein said receiving module receives:
said current bandwidth and said current video quality obtained by said end user device for said service being provided to said end user device, and said traffic parameters of said video content consumed on said end user device by using a sensing application implemented on said end user device.

6. The guaranteed quality of experience system of claim 2, wherein said receiving module receives said online/offline charging parameters pertaining to an user account of said end user device comprising number of bytes consumed per service and cost incurred per service, by interfacing with an offline charging system, an online charging system, and said home subscribe server of said mobile network.

7. The guaranteed quality of experience system of claim 2, wherein said receiving module receives resource utilized in said radio access network of said mobile network, and said current latency obtained by said end user device, by using a base station information of said mobile network.

8. The guaranteed quality of experience system of claim 2, wherein said receiving module receives said content provider server information from said content provider server by using a sensing application implemented on said content provider server.

9. The guaranteed quality of experience system of claim 1, wherein said receiving said quality of experience parameters by said receiving module further comprises deriving a quality of experience index from said received quality of experience parameters related to said type of internet application running on said end user device, quality said end user device is experiencing along with said resources utilized in said mobile network and said content provider server.

10. The guaranteed quality of experience system of claim 9, wherein said derived quality of experience index is used by said processing module for determining said required quality of experience requirements for said internet application running on said end user device.

11. The guaranteed quality of experience system of claim 1, wherein said received quality of experience parameters by said receiving module is user-defined, wherein said receiving module is configured to receive said user-defined quality of experience parameters from a graphical user interface of said end user device.

12. The guaranteed quality of experience system of claim 11, wherein said user-defined quality of experience parameters is configurable in real-time by a network operator, by using said graphical user interface of said guaranteed quality of experience system.

13. The guaranteed quality of experience system of claim 1, wherein said processing module further comprises:
- a rules engine for receiving one or more quality of experience parameters from said end user device, resource utilized at one or more nodes in said mobile network, process one or more set of rules and policies to provide said required quality of experience requirements based on said received quality of experience parameters to said end user device, wherein said rules are combined with said machine learning to optimize said quality of experience provided to said end user device.

14. The guaranteed quality of experience system of claim 13, wherein said rules engine comprising said set of rules is configurable by a network operator by using a graphical user interface of said guaranteed quality of experience system, wherein said network operator is allowed to configure:
- a list of internet applications for which said quality of experience is to be enhanced;
- a quality of experience threshold below which said rules has to kick-in; and
- a time duration for which said rules has to kick-in to provide required quality of experience requirements for said internet application running on said end user device.

15. The guaranteed quality of experience system of claim 13, wherein said rules engine is configured to automatically set one or more rules for a network slicing operation for providing said quality of experience for said internet application running on said end user device.

16. The guaranteed quality of experience system of claim 1, wherein said acting module configured to provide instructions to modify a mobile network resource in order to satisfy said quality of experience requirements of said end user device further comprises:
- providing instructions to modify a bandwidth, a latency, and one or more security parameters to provide said quality of experience for said internet application running on said end user device;
- interfacing with a policy charging and rules function to apply a specific policy for said end user device at a particular time, when said end user device is utilizing a specific kind of traffic;
- interfacing with a policy control enforcement function of said mobile network to apply a specific policy for said end user device at a specific time; and
- setting up a guaranteed bit rate to improve said latency and a connectivity of said internet application to said mobile network, improve said quality of experience requirements to said end user device.

17. The guaranteed quality of experience system of claim 1, wherein said internet application running on said end user device is at least an online video streaming application, an e-commerce application, online video game, self-driven vehicle, drones and internet of things application.

18. A method for providing quality of experience for an internet application running on an end user device, said method employing a guaranteed quality of experience system comprising at least one processor configured to execute computer program instructions for performing said method comprising:
- providing said guaranteed quality of experience system comprising a receiving module, a processing module and an acting module for providing quality of experience of said internet application running on said end user device;
- receiving one or more quality of experience parameters by said receiving module related to a type of internet application running on said end user device, an information related to a quality said end user device is experiencing along with one or more resources utilized in a mobile network and a content provider server by said internet application running on said end user device;
- determining one or more quality of experience requirements for said internet application running on said end user device and communicating said quality of experience requirements to said mobile network and said content provider server by said processing module based on said received quality of experience parameters related to said type of internet application running on said end user device, quality said end user device is experiencing along with said resources utilized in said mobile network and said content provider server by said internet application running on said end user device; and
- providing instructions to one or more of said mobile network and said content provider server to implement a required change in said mobile network to improve a quality of experience for said internet application running on said end user device by said acting module based on said determined quality of experience requirements by said processing module.

19. A non-transitory, computer readable storage medium storing instructions that when executed by one or more processors effectuate operations comprising:
- receiving one or more quality of experience parameters related to a type of internet application running on an end user device, an information related to a quality said end user device is experiencing along with one or more resources utilized in a mobile network and a content provider server by said internet application running on said end user device;
- determining one or more quality of experience requirements for said internet application running on said end user device and communicating said quality of experience requirements to said mobile network and said content provider server based on said received quality of experience parameters related to said type of said internet application running on said end user device, quality said end user device is experiencing along with said resources utilized in said mobile network and said content provider server by said internet application running on said end user device; and
- providing instructions to one or more of said mobile network and said content provider server to implement a required change in said mobile network to improve a quality of experience for said internet application running on said end user device based on said determined quality of experience requirements.

* * * * *